US012768027B2

(12) United States Patent
Araki

(10) Patent No.: US 12,768,027 B2
(45) Date of Patent: Oct. 20, 2026

(54) DECORATIVE COMPONENT AND METHOD FOR PRODUCING DECORATIVE COMPONENT

(71) Applicant: SEIKO GROUP CORPORATION, Tokyo (JP)

(72) Inventor: Akiko Araki, Matsudo (JP)

(73) Assignee: Seiko Group Corporation, Tokyo (JP)

( * ) Notice: Subject to any disclaimer, the term of this patent is extended or adjusted under 35 U.S.C. 154(b) by 245 days.

(21) Appl. No.: 18/846,416

(22) PCT Filed: Feb. 20, 2023

(86) PCT No.: PCT/JP2023/005922
§ 371 (c)(1),
(2) Date: Sep. 12, 2024

(87) PCT Pub. No.: WO2023/188985
PCT Pub. Date: Oct. 5, 2023

(65) Prior Publication Data

US 2025/0207237 A1 Jun. 26, 2025

(30) Foreign Application Priority Data

Mar. 29, 2022 (JP) ................................ 2022-053432
Jun. 21, 2022 (JP) ................................ 2022-099552

(51) Int. Cl.
*C23C 8/12* (2006.01)
*G04B 19/12* (2006.01)
*G04D 3/00* (2006.01)

(52) U.S. Cl.
CPC ................ *C23C 8/12* (2013.01); *G04B 19/12* (2013.01); *G04D 3/0092* (2013.01)

(58) Field of Classification Search
CPC ..... Y10T 428/24479; Y10T 428/24521; Y10T 428/24545; Y10T 428/31678; B32B 3/26;
(Continued)

(56) References Cited

U.S. PATENT DOCUMENTS 4,964,923 A * 10/1990 Takeuchi ................ C04B 41/52
148/276

FOREIGN PATENT DOCUMENTS

CN 113186487 A 7/2021
CN 113215518 A * 8/2021 ............... C23C 8/04
(Continued)

OTHER PUBLICATIONS

Machine translation (Espacenet) of CN 113215518 A. Translated Jul. 11, 2026. (Year: 2026).*
(Continued)

*Primary Examiner* — Maria V Ewald
*Assistant Examiner* — Ethan A. Utt
(74) *Attorney, Agent, or Firm* — Crowell & Moring LLP

(57) ABSTRACT

A decorative component of the present invention is a decorative component including an oxide layer containing cuprous oxide on a surface of the decorative component, in which the oxide layer does not substantially contain bubbles. In a method for producing the decorative component, a component precursor of which a surface is entirely or partially formed of copper, is heated to 700° C. to 900° C. in an electric furnace under conditions in which an oxygen partial pressure is 1300 Pa or less and a supply rate is 50 mL/min or less, and then cooled to form the oxide layer.

20 Claims, 4 Drawing Sheets

(58) Field of Classification Search

CPC ........... B32B 3/28; B32B 15/00; B32B 15/04; B32B 15/20; B32B 2311/12; C23C 8/00; C23C 8/06; C23C 8/08; C23C 8/10; C23C 8/12; G04B 19/00; G04B 19/06; G04B 19/12; G04D 3/00; G04D 3/0074; G04F 3/0092

USPC .... 428/156, 161, 164, 172, 457, 469, 542.2, 428/542.6; 106/286.1, 286.7

See application file for complete search history.

(56) References Cited

FOREIGN PATENT DOCUMENTS

| | | |
|---|---|---|
| EP | 3141520 A1 | 3/2017 |
| JP | A-50-093239 | 7/1975 |
| JP | A-03-260074 | 11/1991 |
| JP | B-2990917 | 12/1999 |
| JP | A-2003-510466 | 3/2003 |
| JP | A-2005-239526 | 9/2005 |
| JP | A-2010-229555 | 10/2010 |
| WO | WO 01/23646 A1 | 4/2001 |

OTHER PUBLICATIONS

Machine translation of "Metal Finishing of Japanese Metal Arts and Crafts". Translated Jul. 11, 2026. (Year: 2026).*

Hachiro Oguchi, "Metal Finishing of Japanese Metal Arts and Crafts", 1983, vol. 32, issue 2, pp. 104-113 (10 pages).

International Search Report in Application No. PCT/JP2023/005922, dated Apr. 25, 2023 (4 pages).

Notice of Allowance in Japanese Application No. 2022-053432, dated May 24, 2022 (4 pages).

Office Action issued in Japanese Application No. 2022-099552 dated Apr. 7, 2026, with English translation (8 pages).

* cited by examiner

DECORATIVE COMPONENT AND METHOD FOR PRODUCING DECORATIVE COMPONENT

REFERENCE TO RELATED APPLICATIONS

This application is a 371 application of PCT/JP2023/005922 having an international application date of Feb. 20, 2023, which claims priority to Japanese Patent Application No. 2022-053432, filed on Mar. 29, 2022, and Japanese Patent Application No. 2022-099552, filed on Jun. 21, 2022, the entire content of each of which is incorporated herein by reference.

TECHNICAL FIELD

The present invention relates to a decorative component and a method for producing the decorative component.

BACKGROUND ART

In a decorative item such as a watch, excellent aesthetic appeal is required in addition to functions. As a method of imparting aesthetic appeal to a decorative component, for example, a method of plating a decorative component with a noble metal having an excellent texture, such as palladium (Pd), rhodium (Rh), platinum (Pt), or gold (Au) (for example, see Patent Document 1), a method of performing a surface treatment, such as anodizing or ion plating, on a decorative component, and a method of performing a coating treatment on a surface of a decorative component are known.

In addition, as a color development method using a metal, a coloring technology called scarlet copper is known. Scarlet copper is a decoration technology for copper, in which an oxide layer containing cuprous oxide (copper(I) oxide: $Cu_2O$) is formed on a surface of pure copper, and a red color is developed by cuprous oxide.

As a method of forming an oxide layer containing cuprous oxide, for example, a method using a flame from a gas burner or the like, and a method of performing a heating treatment in an electric furnace (for example, see Patent Document 2) are known.

CITATION LIST

Patent Documents

Patent Document 1: Japanese Patent No. 2990917

Patent Document 2: Japanese Unexamined Patent Application, First Publication No. 2005-239526

SUMMARY OF INVENTION

Technical Problem

However, in the method of plating with a noble metal, a production cost is high because the noble metal is expensive. In addition, in a case where a plating film is a thin film, pinholes are likely to occur, and durability is likely to decrease. In a case where a thickness of the plating film increases, pinholes are less likely to occur, but there is a concern that a dimensional error increases in a component for a watch with a strict tolerance.

In a case of the surface treatment such as anodizing or ion plating, it is difficult to develop a vivid red color.

In addition, a film formed by plating or a surface treatment exhibits only metallic luster, has insufficient transparency, and has a poor variation in appearance in terms of brightness or saturation.

In a case of the coating treatment, atmospheric corrosion resistance and adhesion of a coating film may be insufficient, which also affects the durability of the decorative component.

In a case where an oxide layer containing cuprous oxide is formed using a gas burner, color reproducibility of the oxide layer is poor, and it is difficult to control the uniform formation of the oxide layer. In addition, since it is also difficult to control a film thickness of the oxide layer, it is difficult to apply the oxide layer to a precision component such as a component for a watch. Furthermore, the oxide layer formed by using a gas burner is likely to contain fine bubbles in the vicinity of a surface of a base material, resulting in a decrease in transparency and deterioration in appearance.

In a case of forming the oxide layer containing cuprous oxide by using an electric furnace, the oxide layer is heated to near a melting point (1083° C.) of copper and then cooled. Therefore, the base material itself may be softened, and thus it is difficult to apply the method to a precision component such as a component for a watch.

An object of the present invention is to provide a decorative component having excellent appearance, durability, and atmospheric corrosion resistance, and a method for producing the decorative component.

Solution to Problem

The present invention has the following aspects.

[1] According to an aspect of the present invention, there is provided a decorative component including: an oxide layer containing cuprous oxide on a surface of the decorative component, in which the oxide layer does not substantially contain bubbles.

According to this configuration, since the decorative component has the oxide layer containing cuprous oxide on the surface, the decorative component exhibits a red color in addition to metallic luster, has a rich variation in brightness and saturation of the red color due to a difference in film thickness, and thus has excellent appearance. In addition, since the oxide layer does not substantially contain bubbles, the oxide layer has high transparency and excellent appearance. Furthermore, the oxide layer is less expensive than a noble metal plating film, and is excellent in durability because pinholes are less likely to occur in the oxide layer than in the plating film. In addition, since pinholes are less likely to occur, it is not necessary to excessively increase the film thickness of the oxide layer, and applicability to a component with a strict dimensional tolerance, such as a watch component, is achieved. In addition, the oxide layer is also superior to a coating film formed by a coating treatment in terms of atmospheric corrosion resistance to ultraviolet rays, adhesion, and the like.

[2] In the decorative component according to the aspect of [1], it is preferable that crystal grains of the cuprous oxide in the oxide layer form one layer in a film thickness direction of the oxide layer.

According to this configuration, the transparency of the oxide layer is further improved, and the appearance is superior.

[3] In the decorative component according to the aspect [1] or [2], it is preferable that a content of the cuprous oxide in the oxide layer is 45 mass % or more with respect to a total mass of the oxide layer.

According to this configuration, it is possible to easily exhibit a red color having desired brightness and saturation. In addition, the transparency of the oxide layer is further increased, and an underlying pattern and the crystal grains of cuprous oxide are visible, thereby enhancing aesthetic appeal.

[4] In the decorative component according to any one of the aspects [1] to [3], it is preferable that a film thickness of the oxide layer is 1 to 150 μm.

According to this configuration, it is possible to control the decorative component to have a red color having desired brightness and saturation within an appropriate film thickness range without increasing the film thickness more than necessary.

[5] In the decorative component according to any one of the aspects [1] to [4], the oxide layer may be partially formed on the surface.

[6] In the decorative component according to any one of the aspects [1] to [5], a color shade of the oxide layer may change in a gradient from one end side to the other end side of the oxide layer.

[7] The decorative component according to any one of the aspects [1] to [6], may further include: a base material, in which a surface of the base material may have an uneven shape, and the oxide layer may follow the uneven shape.

[8] In the decorative component according to any one of the aspects [1] to [7], a coating layer may be provided on a surface of the oxide layer.

[9] In the decorative component according to any one of the aspects [1] to [8], a surface of the oxide layer may be a polished surface.

[10] Examples of the decorative component according to any one of the aspects [1] to [9] include a component for a watch.

[11] According to another aspect of the present invention, there is provided a method for producing the decorative component according to any one of the aspects [1] to [10], the method including: heating a component precursor of which a surface is entirely or partially formed of copper, to 700° C. to 900° C. in an electric furnace under conditions in which an oxygen partial pressure is 1300 Pa or less and a supply rate is 50 mL/min or less, and then cooling the component precursor to form the oxide layer.

According to this configuration, costs can be suppressed compared to a case of performing plating with a noble metal, and pinholes are less likely to occur, so that durability is also excellent. In addition, since pinholes are less likely to occur, it is not necessary to excessively increase the film thickness of the oxide layer, and a dimensional error is less likely to occur.

In addition, it is possible to easily develop a vivid red color, which has been difficult to achieve by a method of performing a surface treatment such as anodizing or ion plating.

In addition, transparency can be obtained in addition to metallic luster, so that a rich variation in brightness and saturation of the red color, and excellent appearance can be achieved.

In addition, compared to the case of performing a coating treatment, superior atmospheric corrosion resistance to ultraviolet rays, adhesion, and the like are achieved.

In addition, it is easy to control the film thickness of the oxide layer compared to a case of forming an oxide layer using a gas burner, and an application to a precision component is also possible. Moreover, bubbles are less likely to be generated in the oxide layer, and the transparency can be maintained at a good level, resulting in excellent appearance.

In addition, since the component precursor is heated at a temperature lower than the melting point of copper, it is possible to prevent the softening of the base material and to apply the component precursor to a precision component.

Advantageous Effects of Invention

According to the present invention, it is possible to provide a decorative component having excellent appearance, durability, and atmospheric corrosion resistance, and a method for producing the decorative component.

DESCRIPTION OF EMBODIMENTS

[Decorative Component]

Hereinafter, a decorative component according to an embodiment of the present invention will be described with reference to the drawings. The following embodiment shows one aspect of the present invention, does not limit the present invention, and can be randomly changed within the scope of the technical idea of the present invention. In addition, in the following drawings, in order to facilitate understanding of each configuration, a scale and the number in each structure are different from a scale and the number in an actual structure.

In addition, in the present specification, a numerical range represented by “to” means a numerical range including numerical values before and after “to” as a lower limit and an upper limit.

Numerical ranges of contents, various physical property values, and property values disclosed in the present specification can be set to new numerical ranges by randomly combining lower limits and upper limits thereof.

Figure 1:
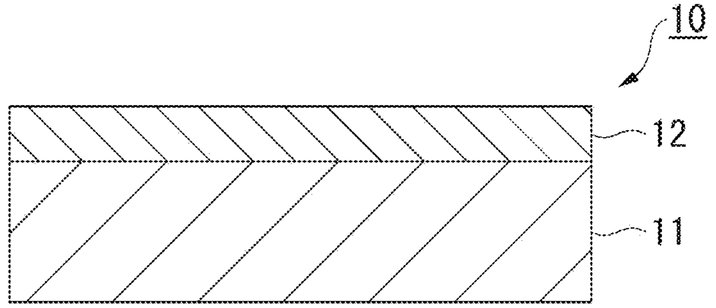
FIG. 1 is a cross-sectional view showing an example of a decorative component according to the present invention.

FIG. 1 is a cross-sectional view showing an example of a decorative component of an aspect of the present invention.

A decorative component 10 shown in FIG. 1 includes a base material 11 and an oxide layer 12 formed on the base material 11. That is, the decorative component 10 has the oxide layer 12 on a surface thereof.

The surface of the decorative component 10 is a surface that is visible from the outside when the decorative component 10 becomes a product.

<Base Material>

The base material 11 in the shown example is copper.

The base material 11 is not limited to copper, and may be, for example, a metal other than copper or ceramic, as long as the material can withstand a temperature at which a component precursor is heated in an electric furnace in a method for producing a decorative component described later and is not easily softened.

Examples of the metal other than copper include a material having a high melting point, such as a copper alloy, silicon, titanium, nickel, and a nickel alloy, and a material having a melting point of 1000° C. or higher.

<Oxide Layer>

The oxide layer 12 is a layer containing cuprous oxide (copper(I) oxide: $Cu_2O$), that is, an oxide film of copper.

Since the oxide layer 12 contains cuprous oxide, the oxide layer 12 exhibits a red color.

The red color of the oxide layer 12 can be adjusted in terms of brightness and saturation according to a content of cuprous oxide in the oxide layer 12 and a film thickness of the oxide layer 12. For example, the higher a proportion of cuprous oxide is, the more vivid the saturation of red color tends to be. In addition, the larger the film thickness is, the more vivid the saturation of red color tends to be, while as the film thickness decreases, a more brownish red or orange color tends to be exhibited.

The content of cuprous oxide in the oxide layer 12 is not particularly limited, and the content of cuprous oxide may be adjusted to achieve desired saturation, brightness, or transparency. However, the content of cuprous oxide is usually preferably 45 mass % or more, more preferably 60 mass % or more, still more preferably 70 mass % or more, and particularly preferably 80 mass % or more with respect to a total mass of the oxide layer 12. When the content of cuprous oxide is equal to or more than the above-described lower limit, a red color having desired brightness and saturation can be easily exhibited. In addition, the transparency of the oxide layer 12 is further increased, and an underlying pattern, that is, a pattern of the base material 11, and the crystal grains of cuprous oxide, are visible, thereby enhancing the aesthetic appeal.

In addition, the content of cuprous oxide in the oxide layer 12 may be 100 mass % with respect to the total mass of the oxide layer 12. That is, the oxide layer 12 may be made of only cuprous oxide.

The upper limit and the lower limit of the content of cuprous oxide can be randomly combined. For example, the content of cuprous oxide in the oxide layer 12 is preferably 45 to 100 mass %, more preferably 60 to 100 mass %, still more preferably 70 to 100 mass %, and particularly preferably 80 to 100 mass % with respect to the total mass of the oxide layer 12.

The content of cuprous oxide can be controlled by adjusting an oxygen partial pressure, a heating temperature, a heating time, and the like in the method for producing a decorative component described later.

The film thickness of the oxide layer 12 is not particularly limited. However, in a case where the decorative component 10 is a component for a watch, the film thickness of the oxide layer 12 is preferably 1 to 150 μm, more preferably 1 to 100 μm, and still more preferably 1 to 10 μm for a component requiring higher precision. When the film thickness of the oxide layer 12 is equal to or more than the above-described lower limit, a red color with sufficient brightness and saturation can be easily exhibited. When the film thickness of the oxide layer 12 is equal to or less than the above-described upper limit, a dimensional error is less likely to increase. Therefore, when the film thickness of the oxide layer 12 is within the above-described range, the decorative component 10 can be controlled to have a red color having desired brightness and saturation within an appropriate film thickness range without increasing the film thickness more than necessary while preventing an increase in the dimensional error.

In particular, in a case where the decorative component 10 is a movement component or the like among components for a watch, the film thickness of the oxide layer 12 is particularly preferably 1 to 10 μm and most preferably 1 to 5 μm.

In addition, in a case where the decorative component 10 is an exterior component such as a dial among the components for a watch, the film thickness of the oxide layer 12 is particularly preferably 3 to 150 μm and most preferably 5 to 50 μm.

The oxide layer 12 does not substantially contain bubbles. Therefore, the oxide layer 12 has high transparency and a luxurious appearance. In addition, since the transparency of the oxide layer 12 is high, the underlying pattern, that is, the pattern of the base material 11, and the crystal grains of cuprous oxide, are visible, thereby enhancing the aesthetic appeal.

In the present invention, "does not substantially contain bubbles" means that bubbles are not visible when the oxide layer 12 is viewed in a plan view. Specifically, it is preferable that the number of bubbles in a region of 20 $\mu m^2$ at any position in a cut section when the oxide layer 12 is cut in a film thickness direction is 1 or less. Alternatively, it is preferable that void ratios of the base material 11 and the oxide layer 12 are the same in a region of 2 μm from an interface between the base material 11 and the oxide layer 12 in the film thickness direction.

It is preferable that the crystal grains of cuprous oxide in the oxide layer 12 form one layer in the film thickness direction of the oxide layer 12. Accordingly, the transparency of the oxide layer 12 is further increased.

Here, the fact that the crystal grains of cuprous oxide form one layer in the film thickness direction of the oxide layer 12 means that the crystal grains of cuprous oxide do not overlap in the film thickness direction of the oxide layer 12.

When the crystal grains of cuprous oxide form two or more layers in the film thickness direction of the oxide layer 12, the crystal grains of cuprous oxide overlap, and this is easily visible as a grain boundary. Therefore, the aesthetic appeal is decreased compared to the case where the crystal grains of cuprous oxide form one layer in the film thickness direction of the oxide layer 12. In addition, when the oxide layer 12 is viewed in a plan view, reflection is likely to occur at an interface between the crystal grains of cuprous oxide in the overlapping portion. Therefore, the transparency is decreased compared to the case where the crystal grains of cuprous oxide form one layer in the film thickness direction of the oxide layer 12.

A ratio (hereinafter, also referred to as an "aspect ratio") expressed as lateral length/longitudinal length, which is a ratio of a lateral length to a longitudinal length, of the crystal grains of cuprous oxide in the oxide layer 12 is preferably 2 or more, more preferably 5 or more, preferably 200 or less, and more preferably 100 or less. When the aspect ratio is equal to or more than the above-described lower limit, graininess of the crystal grains of cuprous oxide is likely to be perceived when the oxide layer 12 is viewed in a plan view. That is, a clear and coarse crystal pattern is visible.

The upper limit and the lower limit of the aspect ratio can be randomly combined. For example, the aspect ratio is preferably 2 to 200 and more preferably 5 to 100.

A number ratio of the crystal grains of cuprous oxide having an aspect ratio within the above-described range to the total number of crystal grains of cuprous oxide is preferably 10% or more, more preferably 20% or more, still more preferably 50% or more, particularly preferably 70% or more, and most preferably 100%, that is, the aspect ratios of all the crystal grains of cuprous oxide are within the above-described range.

The upper limit and the lower limit of the number ratio of the crystal grains can be randomly combined. For example, the number ratio of the crystal grains of cuprous oxide having an aspect ratio within the above-described range to the total number of crystal grains of cuprous oxide is preferably 10% to 100%, more preferably 20% to 100%, still more preferably 50% to 100%, particularly preferably 70% to 100%, and most preferably 100%.

The "longitudinal" of the crystal grain is a side parallel to the film thickness direction of the oxide layer 12, and the "lateral" of the crystal grain is a side perpendicular to the "longitudinal" of the crystal grain.

The oxide layer 12 may further contain components other than cuprous oxide (hereinafter, also referred to as "other components") in addition to cuprous oxide to the extent that effects of the present invention are not impaired.

Examples of the other components include copper(II) oxide (CuO) and pure copper (Cu). That is, the oxide layer 12 may be made of at least one of cuprous oxide (copper(I) oxide), copper(II) oxide, and pure copper (Cu).

A content of copper(II) oxide in the oxide layer 12 is preferably 50 mass % or less, more preferably 40 mass % or less, and still more preferably 10 mass % or less with respect to the total mass of the oxide layer 12. When the content of copper(II) oxide is equal to or less than the above-described upper limit, a red color by cuprous oxide (copper(I) oxide) having desired brightness and saturation can be easily exhibited.

It is noted that, as the proportion of cuprous oxide in the oxide layer 12 increases, the oxide layer 12 exhibits a vivid red color and the transparency tends to increase, while as the proportion of copper(II) oxide in the oxide layer 12 increases, the red color of the oxide layer 12 tends to have a blackish hue and the transparency tends to decrease.

<Production Method>

The decorative component is obtained, for example, by heating a component precursor of which a surface is entirely or partially formed of copper to 700° C. to 900° C. in an electric furnace under conditions with an oxygen partial pressure of 1300 Pa or less and a supply rate of 50 mL/min or less, and then cooling the component precursor to form an oxide layer.

In a case of producing the decorative component 10 shown in FIG. 1, the base material 11 itself, which is made of copper, is used as the component precursor.

The oxygen partial pressure in the electric furnace is 1300 Pa or less, preferably 0.01 to 1300 Pa, and more preferably 1 to 1000 Pa. When the oxygen partial pressure is equal to or less than the upper limit, copper can be oxidized without heating the component precursor to a higher temperature than necessary, specifically, to a temperature close to the melting point of copper, and the oxide layer 12 containing cuprous oxide can be easily formed.

The heating temperature of the component precursor is 700° C. to 900° C., and preferably 750° C. to 850° C. When the heating temperature is equal to or higher than the above-described lower limit, copper can be oxidized, and the oxide layer 12 containing cuprous oxide can be easily formed. When the heating temperature is equal to or lower than the above-described upper limit, softening of the base material itself can be suppressed, and the decorative component 10 can be applied to a precision component such as a component for a watch.

The heating time of the component precursor is not particularly limited, but for example, is preferably 1 to 30 minutes, and more preferably 5 to 10 minutes.

A method of cooling the heated component precursor is desirably rapid cooling, but may also be air cooling.

The decorative component 10 is specifically obtained as follows.

First, in a state where the component precursor is placed in the electric furnace, air in the electric furnace is discharged at room temperature (25° C.) using a vacuum pump or the like, and then a temperature in the electric furnace is raised to 700° C. to 900° C. A temperature rising rate at this time depends on performance of the furnace and is not particularly limited.

Next, after the temperature in the electric furnace is stabilized, a gas containing oxygen (hereinafter, also referred to as an "oxygen-containing gas") is supplied at a supply rate of 50 mL/min or less until the oxygen partial pressure reaches a maximum of 1300 Pa.

Examples of the oxygen-containing gas include oxygen gas and air.

The supply rate of the oxygen-containing gas is 50 mL/min or less, preferably 0.1 to 30 mL/min, and more preferably 1 to 10 mL/min. When the supply rate of the oxygen-containing gas exceeds the above-described upper limit, the crystal grains tend to form a multilayer. The slower the supply rate is, the less likely bubbles are generated in the obtained oxide layer 12.

In addition, the film thickness of the oxide layer 12 can be controlled by a supply amount and a supply time of the oxygen-containing gas supplied to the electric furnace. Specifically, the larger the supply amount of the oxygen-containing gas is, the larger the film thickness of the oxide layer 12 tends to be. In addition, the longer the supply time of the oxygen-containing gas, the larger the film thickness of the oxide layer 12 tends to be.

Next, the component precursor is subjected to a heating treatment by being held in a state where the temperature and the oxygen partial pressure in the electric furnace are maintained for a predetermined time. At this time, the supply of the oxygen-containing gas may be stopped, and the heating treatment may be performed in a state where an inside of the electric furnace is sealed. Alternatively, the heating treatment may be performed while supplying the oxygen-containing gas into the electric furnace without sealing the electric furnace by adjusting a balance between the discharge and the supply of the oxygen-containing gas to set the oxygen partial pressure to be in a desired range.

Next, the inside of the electric furnace is evacuated again and naturally air-cooled, and the decorative component 10 is taken out from the electric furnace at a point in time at which the inside of the electric furnace reaches room temperature.

In this manner, copper on the surface of the component precursor is oxidized to cuprous oxide, and the oxide layer 12 is formed. In a case where the base material 11 itself, which is made of copper, is used as the component precursor, at least the surface of the base material 11 is oxidized to form the oxide layer 12. However, in a case where the heating time is long or the base material is thin, the entire base material 11 may be oxidized to form the oxide layer 12.

<Operating Effects>

Since the decorative component 10 described above has the oxide layer 12 containing cuprous oxide on the surface, the decorative component 10 exhibits a red color in addition to metallic luster, has a rich variation in brightness and saturation of the red color due to a difference in film thickness, and thus has excellent appearance. In addition, since the oxide layer 12 does not substantially contain bubbles, the oxide layer 12 has high transparency and excellent appearance. Furthermore, the oxide layer 12 is less expensive than a noble metal plating film, and is excellent in durability because pinholes are less likely to occur in the oxide layer 12 than in the plating film. In addition, since pinholes are less likely to occur, it is not necessary to excessively increase the film thickness of the oxide layer 12, and applicability to a component with a strict dimensional tolerance, such as a watch component, is achieved. In addition, the oxide layer 12 is also superior to the coating film formed by a coating treatment in terms of atmospheric corrosion resistance to ultraviolet rays, adhesion, and the like. In particular, when the crystal grains of cuprous oxide form one layer in the film thickness direction of the oxide layer 12, the transparency of the oxide layer 12 is further improved, and the appearance is superior.

In addition, according to the method for producing the decorative component 10 described above, the cost can be suppressed compared to the case of performing plating with a noble metal, and pinholes are less likely to occur, so that the durability is also excellent. In addition, since pinholes are less likely to occur, it is not necessary to excessively increase the film thickness of the oxide layer 12, and a dimensional error is less likely to occur.

In addition, it is possible to easily develop a vivid red color, which has been difficult to achieve by a method of performing a surface treatment such as anodizing or ion plating.

In addition, transparency can be obtained in addition to metallic luster, so that a rich variation in brightness and saturation of the red color, and excellent appearance can be achieved.

In addition, compared to the case of performing a coating treatment, superior atmospheric corrosion resistance to ultraviolet rays, adhesion, and the like are achieved.

In addition, it is easy to control the film thickness of the oxide layer 12 compared to a case of forming the oxide layer 12 using a gas burner, and an application to a precision component is also possible. Moreover, bubbles are less likely to be generated in the oxide layer 12, and the transparency can be maintained at a good level, resulting in excellent appearance.

In addition, by setting the oxygen partial pressure in the electric furnace to 1300 Pa or less, the component precursor is heated at a temperature lower than the melting point of copper, so that it is possible to prevent the softening of the base material and to enable an application to a precision component. In addition, When the oxygen partial pressure exceeds 1300 Pa, not only a cuprous oxide film having a red color but also a copper oxide film having a black color may be formed.

Usage

Examples of the decorative component 10 include components for a watch such as a movement, a dial, and an exterior component.

Other Embodiments

The decorative component and the production method thereof of the present invention are not limited to those described above.

For example, a decorative component in which a base material is a metal other than copper or ceramic is obtained by, using a copper film (hereinafter, also referred to as a "copper thin film") formed on a surface of the base material other than copper as a component precursor, heating the component precursor to 700° C. to 900° C. in an electric furnace under a condition in which an oxygen partial pressure is 1300 Pa or less, and then cooling the component precursor.

The copper thin film can be formed by, for example, a sputtering method, a vacuum deposition method, or a plating method.

By heating the component precursor, at least a surface of the copper thin film is oxidized to cuprous oxide, whereby an oxide layer is formed. In a case where a heating time is long or the copper thin film is thin, the entire copper thin film may be oxidized to form the oxide layer 12.

Figure 2:
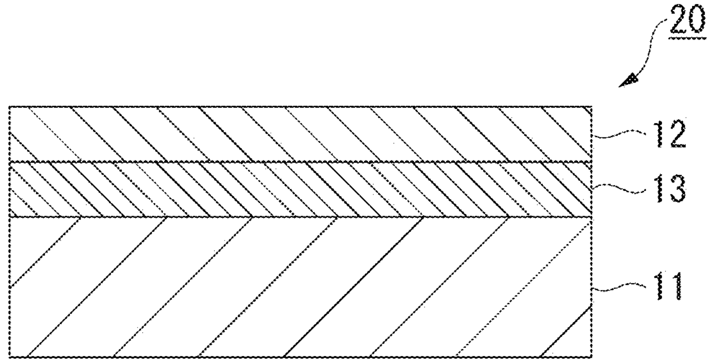
FIG. 2 is a cross-sectional view showing another example of the decorative component according to the present invention.

As shown in FIG. 2, the decorative component thus obtained is provided with a copper thin film 13 between the base material 11 and the oxide layer 12. The base material 11 of a decorative component 20 shown in FIG. 2 is a metal other than copper or ceramic.

In addition, the oxide layer 12 of the decorative component 10 or the decorative component 20 shown in FIGS. 1 and 2 has a substantially constant film thickness. However, for example, as in a decorative component 30 shown in FIG. 3, the film thickness may change in a gradient from one end side to the other end side of the oxide layer 12. As described above, the brightness and saturation of the red color of the oxide layer 12 can be adjusted depending on the content of cuprous oxide in the oxide layer 12 and the film thickness of the oxide layer 12. Therefore, as the film thickness of the oxide layer 12 changes in a gradient, a color shade of the oxide layer 12 changes in a gradient from one end side to the other end side. Specifically, the brightness and saturation of the red color of the oxide layer 12 gradually increase from the thinner to the thicker film thicknesses of the oxide layer 12, and the transparency also gradually increases.

Figure 3:
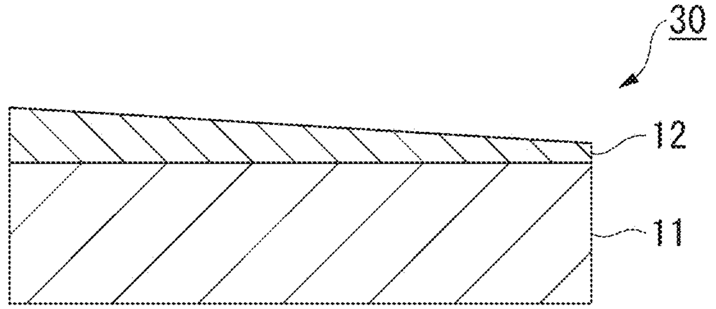
FIG. 3 is a cross-sectional view showing another example of the decorative component according to the present invention.

The decorative component 30 shown in FIG. 3 is obtained, for example, by heating the component precursor in which the copper thin film is formed on the surface of the base material 11 made of a metal other than copper or ceramic so that the film thickness changes in a gradient, to 700° C. to 900° C. under conditions in which the oxygen partial pressure is 1300 Pa or less and the supply rate is 50 mL/min or less, and then cooling the component precursor. The entire copper thin film may be oxidized to form the oxide layer 12, or a part of the copper thin film may remain unoxidized. That is, in the decorative component 30 shown in FIG. 3, a copper thin film (not shown) may be provided between the base material 11 and the oxide layer 12.

Figure 4:
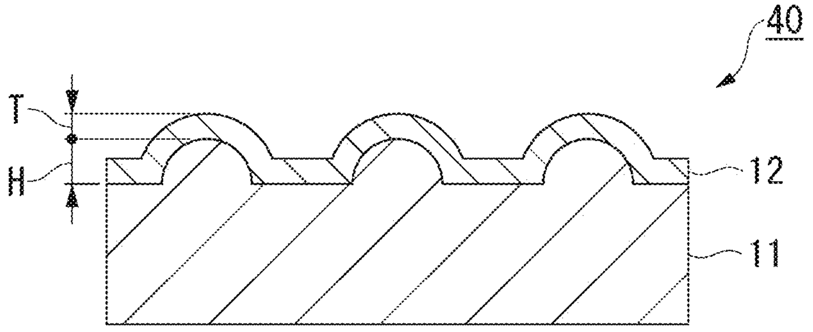
FIG. 4 is a cross-sectional view showing another example of the decorative component according to the present invention.

Although the surface of the base material 11 of the decorative component 10, the decorative component 20, or the decorative component 30 shown in FIGS. 1 to 3 is flat, for example, as in a decorative component 40 shown in FIG. 4, the surface of the base material 11 may have an uneven shape, and the oxide layer 12 may follow the uneven shape of the surface of the base material 11.

It is preferable that a height H of protruding portions constituting the uneven shape of the surface of the base material 11 is larger than a film thickness T of the oxide layer 12.

The decorative component 40 shown in FIG. 4 is obtained, for example, by heating a component precursor in which a copper thin film is formed on the surface of the uneven shape of the base material 11 made of a metal other than copper or ceramic so that the copper thin film follows the uneven shape of the base material 11, to 700° C. to 900° C. under conditions in which the oxygen partial pressure is 1300 Pa or less and the supply rate is 50 mL/min or less, and then cooling the component precursor. The entire copper thin film may be oxidized to form the oxide layer 12, or a part of the copper thin film may remain unoxidized. That is, in the decorative component 40 shown in FIG. 4, a copper thin film (not shown) may be provided between the base material 11 and the oxide layer 12.

Figure 5:
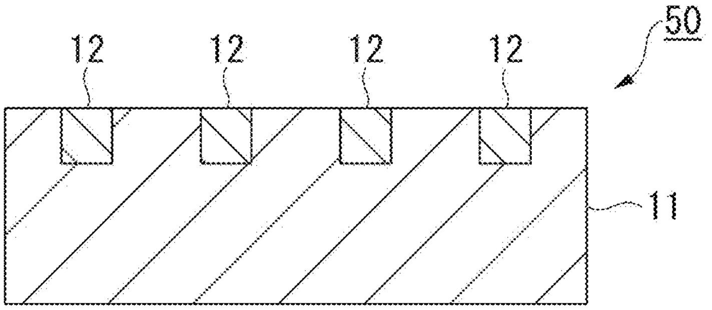
FIG. 5 is a cross-sectional view showing another example of the decorative component according to the present invention.

In addition, for example, as in a decorative component 50 shown in FIG. 5, the oxide layer 12 may be embedded in recessed portions constituting the uneven shape of the surface of the base material 11.

The decorative component 50 shown in FIG. 5 is obtained, for example, by heating a component precursor in which the recessed portions are formed by performing an etching treatment on the surface of the base material 11 made of a metal other than copper or ceramic and copper is embedded in the recessed portions by a plating method or the like, to 700° C. to 900° C. under conditions in which the oxygen partial pressure is 1300 Pa or less and the supply rate is 50 mL/min or less, and then cooling the component precursor. All of the copper embedded in the recessed portion may be oxidized to form the oxide layer 12, or a part of the copper may remain unoxidized.

In addition, in the decorative component 10, the decorative component 20, the decorative component 30, or the decorative component 40 shown in FIGS. 1 to 4, the oxide layer 12 is formed on the entire surface of the base material 11. However, for example, as in a decorative component 60 shown in FIG. 6, the oxide layer 12 may be formed on a part of the surface of the base material 11. That is, the oxide layer 12 may be partially formed on the surface of the decorative component 60.

Figure 6:
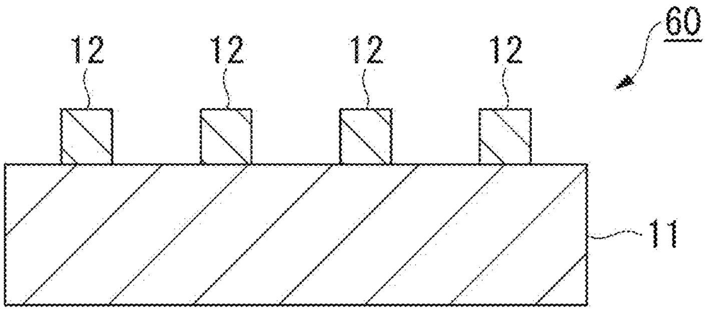
FIG. 6 is a cross-sectional view showing another example of the decorative component according to the present invention.

The decorative component 60 shown in FIG. 6 is obtained, for example, by heating a component precursor in which a copper thin film is partially formed on the surface of the base material 11 made of a metal other than copper or ceramic, to 700° C. to 900° C. under conditions in which the oxygen partial pressure is 1300 Pa or less and the supply rate is 50 mL/min or less, and then cooling the component precursor. The entire copper thin film may be oxidized to form the oxide layer 12, or a part of the copper thin film may remain unoxidized.

In addition, a coating layer may be provided on the surface of the oxide layer 12 shown in FIGS. 1 to 6. That is, the coating layer may be provided on the surface of the decorative component on an oxide layer 12 side.

By providing the coating layer on the surface of the oxide layer 12, alteration and discoloration due to the loss of oxygen from the oxide layer 12 in a reducing atmosphere can be prevented.

As a coating material for forming the coating layer, a transparent material is preferable, and examples thereof include a resin material such as urethane and acrylic. In addition, the coating layer may be a transparent oxide film such as a $SiO_2$ film.

The coating layer is obtained by applying the coating material to the surface of the oxide layer 12 or by forming a transparent oxide film such as a $SiO_2$ film.

In addition, the surface of the oxide layer 12 shown in FIGS. 1 to 6 may be a polished surface.

When the surface of the oxide layer 12 is a polished surface, a sense of luxury is enhanced.

A method of polishing the oxide layer 12 is not particularly limited, and examples thereof include grinding wheel polishing, lapping polishing, and buffing.

In addition, the decorative component 10, the decorative component 20, the decorative component 30, the decorative component 40, the decorative component 50, and the decorative component 60 in the shown examples include the base material 11 and the oxide layer 12, but the decorative component may be made of only the oxide layer 12.

EXAMPLES

Hereinafter, the present invention will be more specifically described using examples, but the present invention is not limited thereto. The embodiments of the present invention can be variously modified within the range not changing the gist of the present invention.

Example 1

As a component precursor, a pure copper material was used.

In a state where the component precursor was placed in an electric furnace, air in the electric furnace was discharged at room temperature (25° C.) using a vacuum pump or the like, and then a temperature in the electric furnace was raised to 800° C. at a temperature rising rate of 15° C./min.

At a point in time when the temperature in the electric furnace reached 800° C., the electric furnace was held for 10 minutes to stabilize the temperature in the electric furnace, and then, in a state where the temperature in the electric furnace was maintained at 800° C., air was supplied into the electric furnace at a supply rate of 50 mL/min such that an oxygen partial pressure was 200 Pa. Thereafter, the electric furnace was sealed. After holding the electric furnace in this state for 10 minutes, the inside of the electric furnace was evacuated to a vacuum and naturally air-cooled, and the decorative component was taken out from the electric furnace at a point in time when the inside of the electric furnace reached room temperature.

Figure 7A:
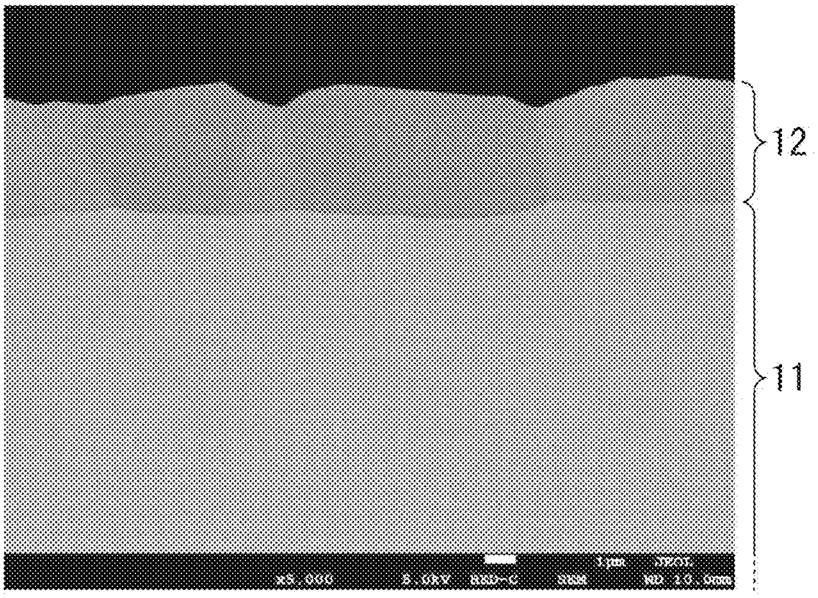
FIG. 7A is a backscattered electron image of a decorative component obtained in Example 1 with a scanning electron microscope (SEM).

The obtained decorative component was cut in a film thickness direction by ion milling cross-sectioning to produce a sample. For this sample, a cut section of the sample was photographed using a scanning electron microscope at an accelerating voltage of 5 kV and a magnification of 5000 times to obtain a backscattered electron image. The obtained backscattered electron image is shown in FIG. 7A.

Comparative Example 1

The same component precursor as that of Example 1 was used.

The component precursor was subjected to a heating treatment with a gas burner for about 1 minute, and then immersed in an aqueous borax solution and rapidly cooled to obtain a decorative component.

A backscattered electron image was obtained from the obtained decorative component in the same manner as in Example 1. The obtained backscattered electron image is shown in FIG. 7B.

As is apparent from the results in FIG. 7A, in the decorative component obtained in Example 1, the oxide layer 12 formed on the surface of the base material 11 did not contain bubbles, and the crystal grains of cuprous oxide in the oxide layer 12 formed one layer in the film thickness direction of the oxide layer 12. In addition, the aspect ratio of the crystal grains of cuprous oxide in the oxide layer 12 was 2 or more.

The decorative component obtained in Example 1 exhibited a deep red color, a clear and coarse crystal pattern was visible, and the transparency was also high.

Figure 7B:
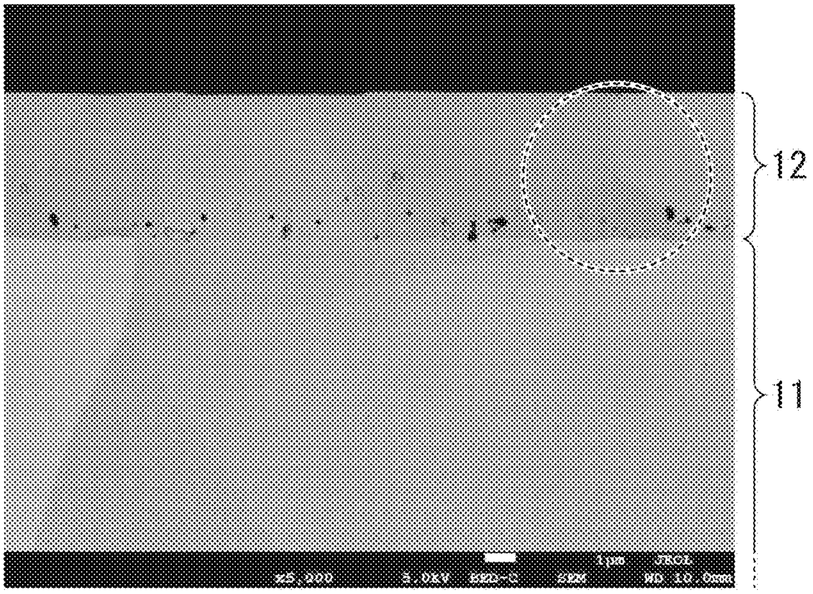
FIG. 7B is a backscattered electron image of a decorative component obtained in Comparative Example 1 with a scanning electron microscope (SEM).

In contrast, as is apparent from the results in FIG. 7B, the decorative component obtained in Comparative Example 1 contained bubbles in the oxide layer 12 formed on the surface of the base material 11. In addition, a region (region surrounded by a broken line in FIG. 7B) in which the crystal grains of cuprous oxide in the oxide layer 12 formed two or more layers in the film thickness direction of the oxide layer 12 was present.

In the decorative component obtained in Comparative Example 1, bubbles were seen in a glittering manner in a plan view, a sense of luxury was insufficient, and the transparency was also low.

Example 2

As a component precursor, a pure copper material was used.

In a state where the component precursor was placed in an electric furnace, air in the electric furnace was discharged at room temperature (25° C.) using a vacuum pump or the like, and then a temperature in the electric furnace was raised to 800° C. at a temperature rising rate of 15° C./min.

At a point in time when the temperature in the electric furnace reached 800° C., the electric furnace was held for 10 minutes to stabilize the temperature in the electric furnace, and then, in a state where the temperature in the electric furnace was maintained at 800° C., air was supplied into the electric furnace at a supply rate of 50 mL/min such that an oxygen partial pressure was 300 Pa. Thereafter, the electric furnace was sealed. After holding the electric furnace in this state for 10 minutes, the inside of the electric furnace was evacuated to a vacuum and naturally air-cooled, and the decorative component was taken out from the electric furnace at a point in time when the inside of the electric furnace reached room temperature.

Figure 8A:
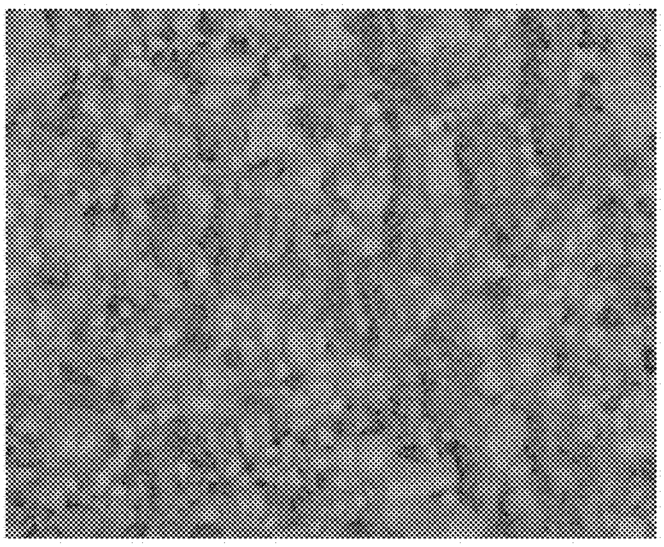
FIG. 8A is an observation image of a decorative component obtained in Example 2 with a laser microscope.

The surface of the decorative component was photographed at a magnification of 50 times using a laser microscope (manufactured by KEYENCE CORPORATION) to obtain an observation image (plan view image). The obtained observation image is shown in FIG. 8A.

Example 3

A decorative component was produced in the same manner as in Example 2, except that air was supplied into the electric furnace at a supply rate of 50 mL/min such that the oxygen partial pressure was 600 Pa, and an observation image was obtained with a laser microscope. The results are shown in FIG. 8B.

Example 4

A decorative component was produced in the same manner as in Example 2, except that air was supplied into the electric furnace at a supply rate of 50 mL/min such that the oxygen partial pressure was 1300 Pa, and an observation image was obtained with a laser microscope. The results are shown in FIG. 8C.

Figure 8B:
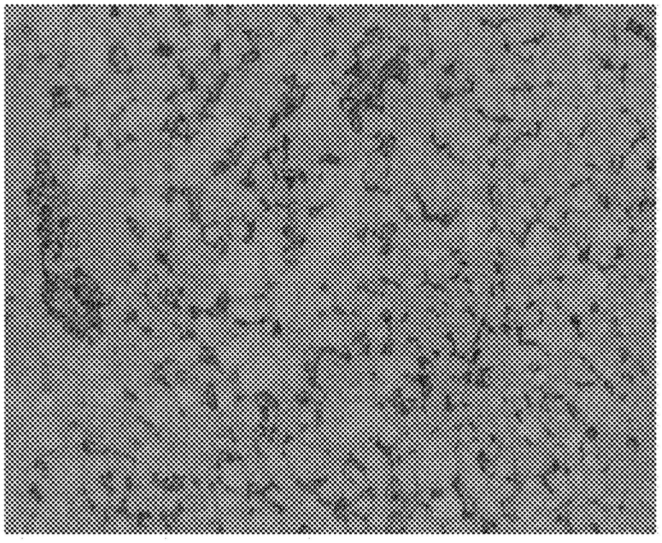
FIG. 8B is an observation image of a decorative component obtained in Example 3 with a laser microscope.
Figure 8C:
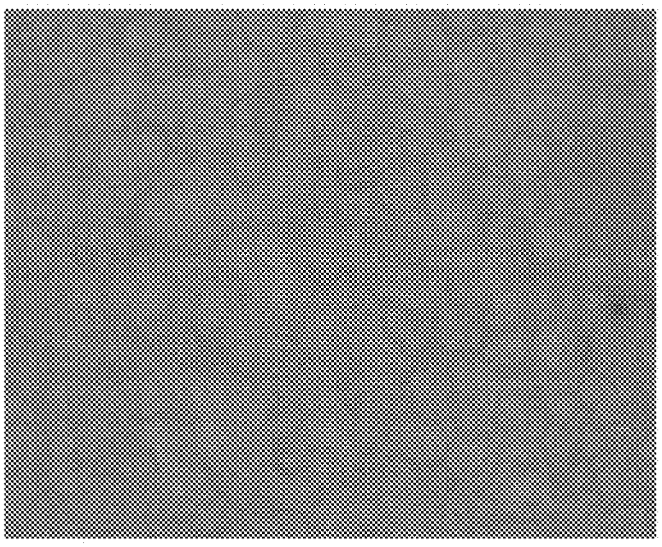
FIG. 8C is an observation image of a decorative component obtained in Example 4 with a laser microscope.

As is apparent from the results shown in FIGS. 8A, 8B, and 8C, in the decorative components obtained in Examples 2 to 4, as the supply amount of air increased, a dense film having high transparency was formed, and a clear and coarse crystal pattern was visible. In addition, as the supply amount of air was larger, the film thickness of the oxide layer was larger, and a vivid red color was exhibited.

INDUSTRIAL APPLICABILITY

The decorative component of the present invention has excellent appearance, durability, and atmospheric corrosion resistance, and is useful as a component for a watch, such as a movement, a dial, or an exterior component.

What is claimed is:

1. A decorative component comprising an oxide layer containing cuprous oxide on a surface of the decorative component, wherein the oxide layer does not substantially contain bubbles.

2. The decorative component according to claim 1, wherein crystal grains of the cuprous oxide in the oxide layer form one layer in a film thickness direction of the oxide layer.

3. The decorative component according to claim 2, wherein a content of the cuprous oxide in the oxide layer is 45 mass % or more with respect to a total mass of the oxide layer.

4. The decorative component according to claim 2, wherein the oxide layer is partially formed on the surface.

5. The decorative component according to claim 2, wherein a color shade of the oxide layer changes in a gradient from one end side to the other end side of the oxide layer.

6. The decorative component according to claim 2, further comprising:

a base material, wherein a surface of the base material has an uneven shape, and the oxide layer follows the uneven shape.

7. The decorative component according to claim 2, wherein a coating layer is provided on a surface of the oxide layer.

8. The decorative component according to claim 2, wherein a surface of the oxide layer is a polished surface.

9. The decorative component according to claim 1, wherein a content of the cuprous oxide in the oxide layer is 45 mass % or more with respect to a total mass of the oxide layer.

10. The decorative component according to claim 1, wherein a film thickness of the oxide layer is 1 to 150 μm.

11. The decorative component according to claim 1, wherein the oxide layer is partially formed on the surface.

12. The decorative component according to claim 1, wherein a color shade of the oxide layer changes in a gradient from one end side to the other end side of the oxide layer.

13. The decorative component according to claim 1, further comprising a base material, wherein a surface of the base material has an uneven shape, and the oxide layer follows the uneven shape.

14. The decorative component according to claim 1, wherein a coating layer is provided on a surface of the oxide layer.

15. The decorative component according to claim 1, wherein a surface of the oxide layer is a polished surface.

16. The decorative component according to claim 10, wherein a surface of the oxide layer is a polished surface.

17. The decorative component according to claim 16, wherein the oxide layer is partially formed on the surface.

18. The decorative component according to claim 16, further comprising:

a base material, wherein a surface of the base material has an uneven shape, and the oxide layer follows the uneven shape.

19. The decorative component according to claim 1, wherein the decorative component is a component for a watch.

20. A method for producing the decorative component according to claim 1, the method comprising heating a component precursor of which a surface is entirely or partially formed of copper, to 700° C. to 900° C. in an electric furnace under conditions in which an oxygen partial pressure is 1300 Pa or less and a supply rate is 50 mL/min or less, and then cooling the component precursor to form the oxide layer.

* * * * *